Patented Apr. 2, 1946

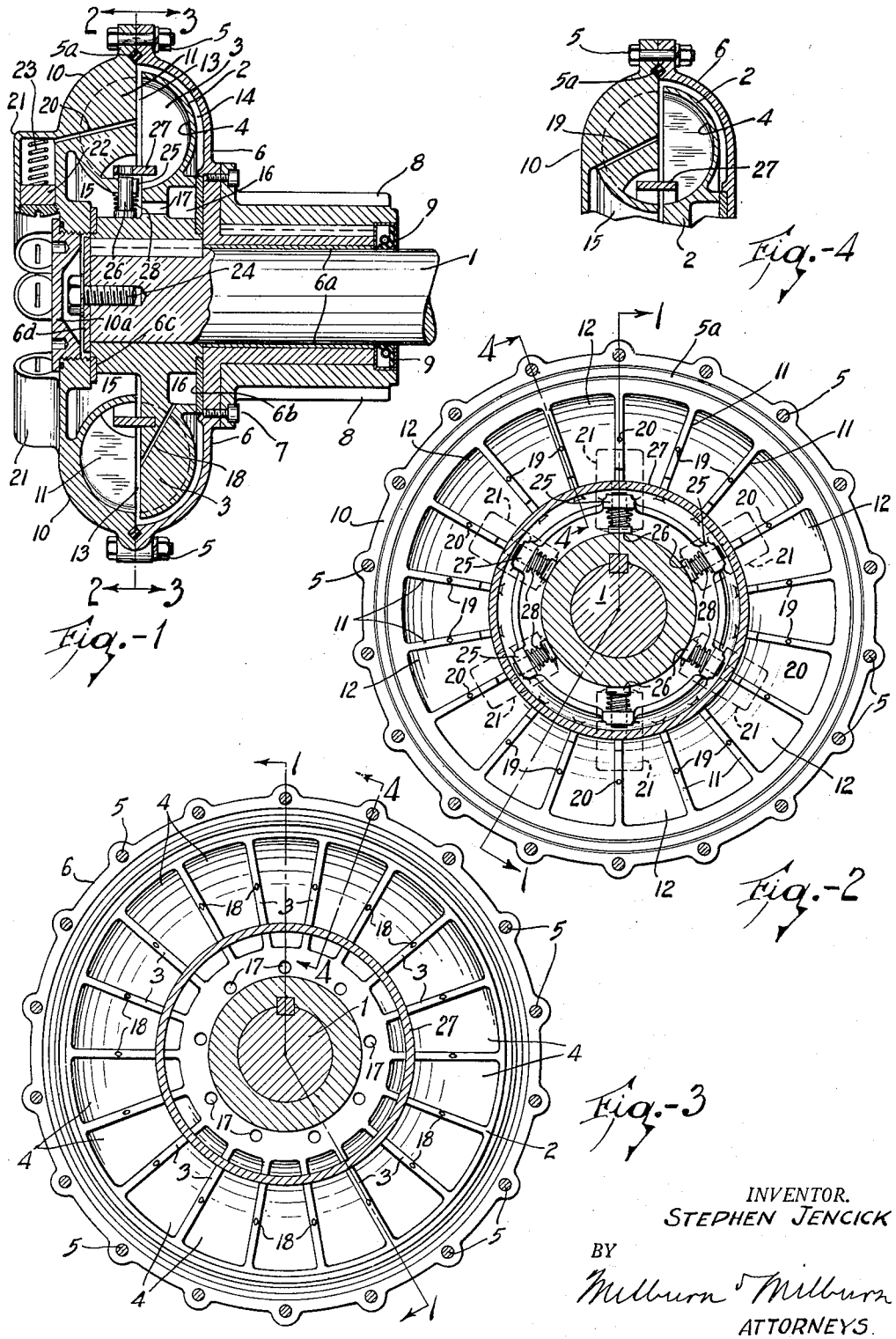

2,397,862

UNITED STATES PATENT OFFICE 2,397,862

FLUID COUPLING

Stephen Jencick, Chagrin Falls, Ohio

Application November 12, 1943, Serial No. 510,043

1 Claim. (Cl. 60—54)

This invention relates to the art of fluid couplings.

One object of this invention is to devise a fluid coupling in which the transmission of power will be accelerated in an extremely gradual manner from the very point of initial starting.

Another object is to provide such a fluid coupling with means for automatically locking the driving and driven members together in a positive manner at a predetermined rate of speed of the driven member in order to maintain such desired rate of speed thereafter, such locking engagement to be automatically released so as to permit disengagement of the same at the proper time.

Another object is to devise a fluid coupling in which the means for supplying fluid thereto is included as a part thereof so that the coupling may be regarded as a self-contained device.

Another object is to devise a fluid coupling in which there is contained a residual supply of fluid for initiating the starting movement of the driven member, and also an additional means of fluid supply which is automatically actuated for gradually augmenting the rate of rotation of the driven member.

Other objects will appear from the following description and claim when considered together with the accompanying drawing.

Fig. 1 is a sectional view taken on line 1—1 of Figs. 2 and 3 and shows the coupling in assembly;

Fig. 2 is a sectional view taken on line 2—2 of Fig. 1 and shows one of the coupling members;

Fig. 3 is a sectional view taken on line 3—3 of Fig. 1 and shows the other of the coupling members; and Fig. 4 is a detail view taken on line 4—4 of Figs. 2 and 3.

It is to be understood that the present form of disclosure is merely for the purpose of illustration and that there might be devised various modifications thereof without departing from the spirit of my invention as herein set forth and claimed.

The drive shaft 1 has keyed thereto the coupling member 2 which is provided with an annular series of alternating vanes 3 and recesses 4. The vanes 3 are parallel to each other and extend in planes normal to the direction of rotion of the same; and the rear wall of each recess 4 has a substantially semi-cylindrical curvature in a plane that is also substantially normal to that of the rotation of the same. These vanes and recesses are duplicates of each other in each instance. The member 2 may be referred to as the impeller element.

The driven member comprises two parts that are bolted together at 5, with a suitable annular sealing means 5a, and surrounds the driving member 2. In fact, the driven member, in the present form of disclosure, is mounted upon the drive shaft 1, as will appear from the present illustration.

The one part 6 of the driven member has bearing engagement about the drive shaft 1 and has suitably secured thereto, as by means of the bolts 7, the member 8 which may be in the form of a gear or sheave or the like. There is provided a suitable bearing means 6a between the member 8 and the shaft 1 and also a suitable form of annular sealing means as indicated at 9.

The other part 10 of the driven member is provided with an annular series of alternating vanes 11 and recesses 12. These vanes and recesses are of substantially the same form and dimensions as those of the driving member and are of the same number as those of the driving member.

The two parts 6 and 10 together may be referred to as a turbine-like element.

The driving and driven members are so mounted as to provide a suitable space 13 therebetween; and there is also a suitable space 14 between the driving member and the part 6 of the driven member. These spaces are in communication with each other and also with the annular space 15, provided in the inner region of the driven member, and the annular space 16 in the inner region of the driving member, the ports 17 affording means of communication for the annular space 16. The spaces 15 and 16 and the ports 17 together constitute a reservoir for a residual supply of the fluid, the function of which will more clearly appear from the following.

Each of the vanes 3 of the driving member is formed with a passage 18 therethrough so as to afford communication between the space 13 and that part 16 of the residual reservoir; while the like passages 19 extend through all of the vanes 11 of the driven member, with the exception of six of them according to the present illustration, so as to provide communication between the space 3 and that part 15 of the residual reservoir.

The other six vanes 11 of the driven member are formed with the passages 20 which supply communication between space 13 and the additional reservoirs 21 which are mounted upon the wall of the driven member. The reservoirs 21 are of cylindrical form and have their longitudinal axes extending radially of the coupling. Each of these cylindrical reservoirs has a plunger 22 which is normally forced by spring 23, in each instance, to withdrawn position; while the plunger 22 will be moved radially outwardly by centrifugal force which is set up by rotation of the driven member. All of the passages 18, 19 and 20 terminate at approximately the middle points of the edges of their respective vanes.

When the fluid contents of the reservoirs 21 have been forced by the plungers 22 into the space between the driving and driven members, such space will be substantially full as far as is practical. Then, when there has been withdrawn fluid by the plungers into the reservoirs 21 so as to fill the same, there will be left a residual quantity of fluid in the spaces 13, 14, 15 and 16, the purpose of which will be later explained.

It will be observed from the present form of illustration that I have provided suitable bearing means at those points of relative movement between the driving and driven members, at indicated at the points 6a, 6b, 6c and 6d. The bearing means 6d is secured to the end of the driving shaft by means of the screw bolt 24; and the screw plug closure 10a at the center of the part 10 of the driven member is cut away upon its under side so as to provide clearance for the head of the bolt 24.

The part 10 of the driven member is provided with a plurality of enlarged portions 25 through which extend the bolts or pins 26 for locking engagement in correspondingly formed holes in the ring 27 which is mounted upon the driving member so as to extend therefrom into the path of movement of the bolts or pins 26. As indicated in the drawing, the vanes of the driven member are cut away in order to accommodate these parts. Each pin 26 is withdrawn to and held in idle position by the coil spring 28, the head of the pin in each instance being adapted to engage the adjacent wall of the driving member so as to definitely determine the extent of movement thereof by the spring 28. When the rate of speed of the driven member attains a predetermined point, the pins 26 will be projected radially outwardly by centrifugal force and will come into locking engagement with the corresponding holes in the ring member 27. This will then ensure maintenance of the rate of speed of the driven member exactly at the same point as that of the driving member so long as this interlocked condition continues between the driving and driven members; that is, so long as the rotation of the driving member is maintained at least at the predetermined rate of speed.

Upon initiation of the operation of the drive shaft, the residual fluid supply that is enclosed within the space enclosed by the walls of the driven member, will exert sufficient drag upon the vanes of the driven member to initiate rotary movement of them even from a still position. This residual supply of fluid will of course be free for movement in the entire space that is enclosed within the walls of the driven member; and such motion of this residual fluid will exert sufficient force upon the vanes of the driven member to initiate such rotary movement thereof, as above referred to.

Rotary movement of the driven member will cause the plungers 22 to move radially outwardly by virtue of centrifugal force and this will cause the fluid within the reservoirs 21 to be forced therefrom through the passages 20, across the space 13 and into the recesses 4 of the driving member. By virtue of the curved form of the rear walls of the recesses, the fluid thus projected thereinto will be given a swirling circular motion about the complementary curved walls of the opposite recesses of the drive and driven members, this motion of the fluid being in planes substantially normal to the direction of rotation of the driving and driven members; and this circular motion of the fluid extends across the space 13 between these members. As a result, there is effected a gradual acceleration of the speed of rotation of the driven member, there being a gradual increase in the transmission of power through the medium of the fluid from the drive member to the driven member.

When the reservoirs 21 have been emptied of their fluid, all of the space within the coupling is practically filled with fluid except for necessary allowance for air and expansion.

The space 13 will be of suitable width in order to ensure proper transmission of power through the medium thereof and without any danger of the fluid being cut by the rotating vanes and its proper functioning interfered with. Likewise for the same purpose, the driving and driven members each have the same number of vanes and recesses.

As above explained, the driven member will be positively locked to the driving member so as to be rotated therewith when there has been attained a predetermined rate of speed of the driven member. Then, when the speed is permitted to fall below the predetermined point, the driven member will be automatically released from its locked condition and it may then continue to operate at any lower rate of speed.

As the rate of speed of the driven member is lowered, the plungers 22, under the influence of the springs 23, will cause the fluid to return to the reservoirs 21 and to be held therein. That is, this withdrawal of the fluid will take place to the extent of filling the reservoirs 21, leaving the residual fluid supply within the space provided therefor, as above explained.

By drilling the passages 20 of suitable bore, there may be determined the rate of flow of the fluid therethrough. This is especially important in the very starting and throughout all successive stages of continued operation as it serves as a means of ensuring gradual building up of the rate of speed of the driven member.

Likewise the passages 18 and 19 will also be drilled so as to have suitable bore and to ensure their functioning in the most efficient manner.

There may be selected a fluid of suitable specific gravity in order to attain the greatest degree of efficiency under any given set of conditions.

As indicated in the drawing, each reservoir 21 is provided with a suitable removable plug 21a; and there may be made like provision through the wall of the driven member so as to afford access for initial installation or for servicing.

As will be seen from the present disclosure, my device is entirely self-contained including the centrifugally-actuated plungers for governing the supply of additional fluid to the coupling.

When my present coupling is employed in an automobile assembly, there is eliminated the necessity of the conventional gears and clutch for the shifting from one speed to another. If it be so desired, in some instances, there may be provided a clutch between the driven member of the coupling and the load for the purpose of relieving the driven member of such load during the initial starting and until there has been attained a suitable rate of speed to pick up the load. However, as above explained, there is no occasion to employ either clutch or gears for the purpose of changing from one speed to another during its operation.

It is to be understood that either the drive member or the driven member may be provided with any desirable form of drive connection; and the specific relative arrangement of the driving and driven members may also be varied according to the particular design that may be dictated by the existing conditions in any given situation.

What I claim is:

A fluid coupling comprising concentrically arranged drive and driven members both having the same number of annularly disposed alternating substantially duplicate vanes and substantially semi-cylindrical recesses with the rear wall of each recess curved in a plane substantially normal to the direction of rotation of said members, the vanes and recesses of the one member facing and being suitably spaced from those of the other member, means providing a space completely enclosed within the coupling for residual fluid about said recesses so that fluid within said space may have operative relation to said recesses, some of the vanes of the driven member and all of the vanes of the drive member having passages therethrough from the adjacent edges thereof to the space for the residual fluid and in the direction of the fluid flow between said members so as to facilitate the initiation of the starting movement of the driven member by the drive member, each pair of oppositely disposed recesses on the two members providing together a substantially circular surface for directing the flow of the fluid thereabout across the space between said members, a plurality of cylindrical reservoirs provided upon said driven member for additional fluid, centrifugally-actuated plungers in said reservoirs for forcing the additional fluid therefrom and into the recesses of the drive member, spring means for causing said plungers to withdraw the additional fluid into said reservoirs upon cessation of the centrifugal force, whereby the residual fluid will serve as a means of initiating the starting movement of the driven member by the drive member, and the additional fluid will be set into motion across the space between the opposite recesses of said members and the force of the drive means between said members will be thereby gradually augmented.

STEPHEN JENCICK.